United States Patent [19]

Katagiri et al.

[11] Patent Number: 4,555,472
[45] Date of Patent: Nov. 26, 1985

[54] ORGANIC COATING FILM AND RADIATION-SENSITIVE MEMBER HAVING THE FILM

[75] Inventors: Kazuharu Katagiri; Yoshihiro Oguchi, both of Yokohama, Japan

[73] Assignee: Canon Kabushiki Kaisha, Tokyo, Japan

[21] Appl. No.: 577,208

[22] Filed: Feb. 6, 1984

[30] Foreign Application Priority Data

Feb. 9, 1983 [JP] Japan .................................. 58-18785
Feb. 9, 1983 [JP] Japan .................................. 58-20786

[51] Int. Cl.⁴ .......................... G03C 1/72; G03C 1/94
[52] U.S. Cl. ................................ 430/278; 430/275; 430/495; 430/592; 430/594; 430/595; 546/152; 548/159; 548/179; 548/467
[58] Field of Search ............ 430/495, 592, 594, 595, 430/275, 278; 546/152; 548/159, 179, 467

[56] References Cited

U.S. PATENT DOCUMENTS

| | | | |
|---|---|---|---|
| 2,474,426 | 6/1949 | Kendall et al. | 430/594 X |
| 2,972,539 | 2/1961 | Jones | 430/594 X |
| 3,579,346 | 5/1971 | Brooker et al. | 430/594 X |
| 4,492,750 | 1/1985 | Law et al. | 430/495 X |

FOREIGN PATENT DOCUMENTS

| | | | |
|---|---|---|---|
| 2841179 | 12/1979 | Fed. Rep. of Germany | 430/495 |
| 774779 | 5/1957 | United Kingdom | 548/159 |

*Primary Examiner*—Roland E. Martin
*Attorney, Agent, or Firm*—Fitzpatrick, Cella, Harper & Scinto

[57] ABSTRACT

An optical recording member having an organic coating film comprising a compound of the general formula:

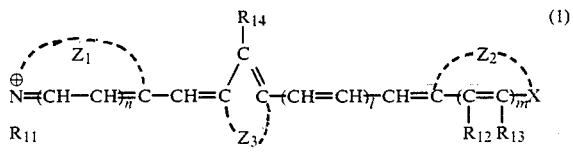

wherein; $Z_1$ is an atomic group necessary to form a substituted or unsubstituted nitrogen-containing heterocyclic compound ring; $Z_2$ is an atomic group necessary to form a substituted or unsubstituted pyrane, thiapyrane, selenapyrane, benzopyrane, benzothiapyrane, benzoselenapyrane, naphthopyrane, naphathiopyrane, or naphthoselenapyrane ring; X is a sulfur, oxygen, or selenium; $Z_3$ is a divalent hydrocarbon residue necessary to form a 5- or 6-membered ring substituted or unsubstituted; $R_{11}$ is a hydrogen atom or substituted or unsubstituted alkyl; $R_{12}$ and $R_{13}$ each are a hydrogen atom, halogen atom, alkyl, alkoxy, aryl, substituted aryl, styryl, substituted styryl, or substituted or unsubstituted heterocyclic residue; $R_{14}$ is a hydrogen or halogen atom; $A^\ominus$ is an anion; m and n each are 0 or 1; and l is 0, 1, or 2.

13 Claims, 3 Drawing Figures

ORGANIC COATING FILM AND RADIATION-SENSITIVE MEMBER HAVING THE FILM

BACKGROUND OF THE INVENTION

1. Field of the Invention

This invention relates to an organic coating film capable of effectively absorbing laser beams, especially longer wavelength beams emitted from semiconductor lasers, and capable of converting these beams into other energy. More particularly, this invention relates to a novel organic coating film adaptable as an electrophotographic photosensitive coat for electrophotographic printers employing a semiconductor laser as light source, as a coat for optical disks where the writing and reproduction of information are possible with semiconductor laser beams, as an infrared cutting filter, etc.

2. Description of the Prior Art

The electrophotographic printer employing a semiconductor laser as light source can form reproduced images by modulating the laser with electric signals in response to the given information image, scanning a photosensitive member with the modulated laser beam to form an electrostatic latent image, developing the latent image with a toner, and transferring the toner image. Lasers generally used for this purpose are gas lasers such as a helium-cadmium laser (wavelength: 441.6 nm), a helium-neon laser (wavelength: 632.8 nm), and the like. Accordingly, photosensitive members spectrally sensitized up to about 650 nm are adaptable for those light sources. Such photosensitive members hitherto known include, for example, those having a photosensitive layer comprising a charge transfer complex of polyvinylcarbazole with trinitrofluorenone, those having a photosensitive layer consisting of a vapor-deposited layer of tellurium sensitized with selenium, those having photosensitive layers: a charge transport layer of selenium vapor-deposited upon a conductive layer and a selenium-tellurium layer vapor-deposited upon the selenium layer, those having a photosensitive layer of cadmium sulfide spectrally sensitized with a sensitizing dye, and those having two photosensitive layers which function separately as a charge generation layer containing an organic pigment and a charge transport layer and are spectrally sensitized to longer wavelengths.

On the other hand, the recording film used in the optical disk technique can store information in a high density as a spiral or circular track of fine pits (e.g. about 1µ in diameter) optically detectable. For writing information on such disk, the laser-sensitive layer thereof is spirally or circularly scanned with a converged laser beam (modulated in response to the information), thereby forming a spiral or circular track of pits where the laser beam falls on. The laser-sensitive layer can form optically detectable pits by absorbing laser energy. For instance, in a thermal mode recording system, the laser-sensitive layer can absorb laser energy and form fine pits at the absorption points by evaporation or melting. In another thermal mode recording system, pits having optically detectable density difference can be formed with absorbed laser energy at the points irradiated with a laser beam.

The information recorded on an optical disk can be read by tracing the track of pits with a laser beam and detecting optical difference between the pit and the pit-less area. For instance, the track is traced with a laser beam and the energy reflected from the disk is monitored with a photodetector. The laser beam, when falling on the pit-less area, lowers the output of the photodetector, and when hitting the pit, is sufficiently reflected from an underlying reflecting face and hence increases the output of the photodetector.

Coating films hitherto proposed as recording media for use in these optical disks are principally inorganic such as thin metal films (e.g. a vapor-deposited aluminum film), thin bismuth film, thin tellurium oxide film, and amorphous glass films of chalcogenite group.

Meanwhile semiconductor lasers have been developed in recent years, which can be made in small sizes at low costs and additionally can be modulated directly. Most of these semiconductor lasers have wavelengths of 750 nm or longer. Consequently, the laser-sensitive coat used for recording and/or reproduction with such semiconductor laser needs to have an absorption maximum in a longer wavelength region (generally the region of 750–850 nm).

However, conventional laser-sensitive coats, particularly those comprising mainly inorganic materials, have the drawbacks of poor utilization of laser energy and low sensitivity to laser beams, because of their high laser beam reflectivities. Moreover, these laser-sensitive coats are disadvantageous in that the extension of their spectral sensitivity up to 750 nm or longer complicates the structure of the laser-sensitive coat and particularly when these coats are used for electrophotography, sensitizing dyes incorporated therein fade during repetition of the charging and exposing.

Such being the case, there have been proposed in recent years organic coating films which are highly sensitive to rays of wavelengths 750 nm or longer. For example, pyrylium dye-containing organic films disclosed in U.S. Pat. No. 4,315,983 and "Research Disclosure", 20517 (1981.5) and a squarilium-dye-containing organic film disclosed in J. Vac. Sci. Technol., 18 (1), pp 105–109 (Jan./Feb. 1981) are known to be sensitive to laser beams of wavelengths 750 nm or longer.

However, organic compounds absorbing light of the longer wavelength are generally the more unstable, so that these organic films involve problems such as the liability to decompose even with a little temperature rise; in addition these films need to fulfill various requirements on performance characteristics for electrophotographic printers or optical disks. It is the present situation that the organic coating films developed up to now are not always satisfactory practicably.

SUMMARY OF THE INVENTION

The first object of the present invention is to provide a novel and useful organic coating film.

The second object of the present invention is to provide an orgnic coating film having an absorption band in a longer wavelength region, particularly at 750 nm or longer.

The third object of the present invention is to provide an organic coating film stable to heat.

The fourth object of the present invention is to provide an electrophotographic photosensitive coat for the electrophotographic printer employing a laser as light source.

The fifth object of the present invention is to provide an electrophotographic photosensitive coat highly sensitive to rays of wavelengths 750 nm or longer.

The sixth object of the present invention is to provide a recording film for optical disks.

The seventh object of the present invention is to provide an optical disk recording film highly sensitive to rays of wavelengths 750 nm or longer and exhibiting sufficiently high S/N ratios.

These objects of the present invention are achieved with an organic coating film comprising a compound represented by the following general formula (1) or (2).

General formula (1):

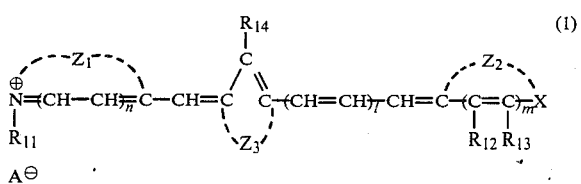

In this formula; $Z_1$ is an atomic group necessary to form a substituted or unsubstituted nitrogen-containing heterocyclic compound ring; $Z_2$ is an atomic group necessary to form a substituted or unsubstituted pyrane, thiapyrane, selenapyrane, benzopyrane, benzothiapyrane, benzoselenapyrane, naphthopyrane, naphthothiapyrane, or naphthoselenapyrane ring; X is a sulfur, oxygen, or selenium atom; $Z_3$ is a divalent hydrocarbon residue necessary to form a 5- or 6-membered ring substituted or unsubstituted; $R_{11}$ is a hydrogen atom or substituted or unsubstituted alkyl; $R_{12}$ and $R_{13}$ each are a hydrogen or halogen atom or organic monovalent residue; $R_{14}$ is a hydrogen or halogen atom; $A^\ominus$ is an anion; m and n each are 0 or 1; and l is 0, 1, or 2.

General formula (2):

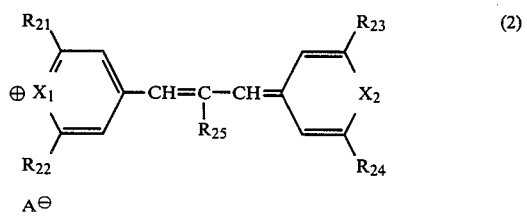

In this formula; $R_{21}$, $R_{22}$, $R_{23}$, and $R_{24}$ each are a substituted or unsubstituted aryl or a substituted or unsubstituted heterocyclic compound residue with the proviso that at least one of $R_{21}$, $R_{22}$, $R_{23}$, and $R_{24}$ is a substituted or unsubstituted heterocyclic compound residue; $R_{25}$ is a hydrogen atom, alkyl, or substituted or unsubstituted aryl; $X_1$ and $X_2$, each are an oxygen, sulfur, or selenium atom; and $A^\ominus$ is an anion.

DETAILED DESCRIPTION OF THE PREFERRED EMBODIMENTS

Figure 1:
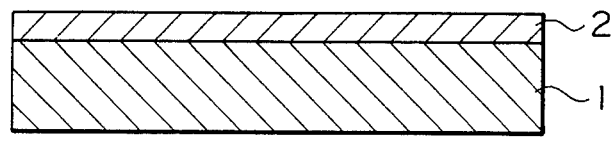
FIGS. 1 and 2 are cross-sectional views of optical disks provided with the organic coating film of this invention.

Compounds used in the organic coating film of this invention are represented by the general formula (1) or (2). In the first place, the meaning of the notations in the general formula (1)

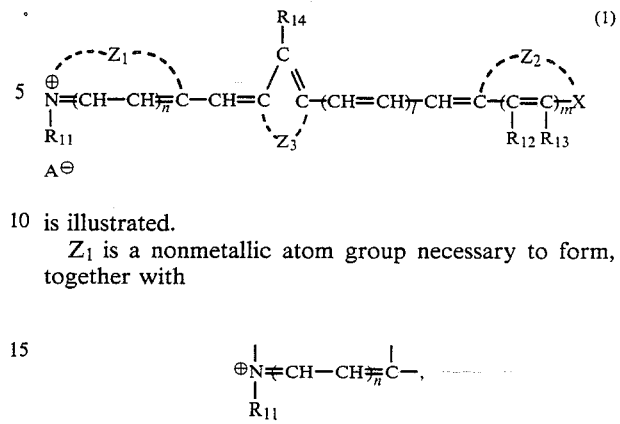

is illustrated.

$Z_1$ is a nonmetallic atom group necessary to form, together with $$\overset{\oplus}{N}\!\!=\!\!CH\!-\!CH\!\overset{}{\underset{n}{=}}C\!-\!,\;\underset{R_{11}}{|}$$

a nitrogen-containing heterocyclic ring substituted or unsubstituted. Examples of this ring are; those of thiazole compounds [e.g. thiazole, 4-methylthiazole, 4-phenylthiazole, 5-methylthiazole, 5-phenylthiazole, 4,5-dimethylthiazole, 4,5-diphenylthiazole, and 4-(2-thienyl)thiazole]; those of benzothiazole compounds (e.g. benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-di(hydroxymethyl)benzothiazole, 5-hydroxybenzothiazole, 6-hydroxybenzothiazole, and 4,5,6,7-tetrahydrobenzothiazole); those of naphthothiazole compounds (e.g. naphtho[2,1-d]thiazole, naphtho[1,2-d]thiazole, 5-methoxynaphtho[1,2d]thiazole, 5-ethoxynaphtho[1,2-d]thiazole, 8-methoxynaphtho[2,1-d]thiazole, and 7-methoxynaphtho[2,1-d]thiazole); those of thionaphthene[7,6-d]thiazole compounds (e.g. 7-methoxythionaphthene[7,6-d]thiazole); those of oxazole compounds (e.g. 4-methyloxazole, 5-methyloxazole, 4-phenyloxazole, 4,5-diphenyloxazole, 4-ethyloxazole, 4,5-dimethyloxazole, and 5-phenyloxazole); those of benzoxazole compounds (e.g. benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole, 5-hydroxybenzoxazole, and 6-hydroxybenzoxazole); those of naphthoxazole compounds (e.g. naphtho[2,1-d]oxazole and naphtho[1,2-d]oxazole); those of selenazole compounds (e.g. 4-methylselenazole and 4-phenylselenazole); those of benzoselenazole compounds (e.g. benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-di(hydroxymethyl)benzoselenazole, 5-hydroxybenzoselenazole, and 4,5,6,7-tetrahydrobenzoselenazole); those of naphthoselenazole compounds (e.g. naphtho[2,1-d]selenazole and naphtho[1,2-d]selenazole); those of thiazoline compounds (e.g. thiazoline, 4-methylthiazoline, 4-hydroxymethyl-4-methylthiazoline, and 4,4-di(hydroxymethyl)thiazoline); those of oxazoline compounds (e.g. oxazoline); those of selenazoline compounds (e.g. selenazoline); those of 2-quinolyl group residues (e.g. 2-quinolyl, 6-methyl-2-quinolyl, 6-chloro-2-quinolyl, 6-methoxy-2-quinolyl, 6-ethoxy-2-quinolyl, and 6-hydroxy-2-quinolyl); those of 4-quinolyl group residues (e.g. 4-quinolyl, 6-methoxy-4-quinolyl, 7-methyl-4-quinolyl, and 8-methyl- 4-quinolyl); those of 1-isoquinolyl group residues (e.g. 1-isoquinolyl and 3,4-dihydro-1-isoquinolyl); those of 3-isoquinolyl residues (e.g. 3-isoquinolyl); those of 3,3-dialkylindolenine compounds (e.g. 3,3-dimethylindolenine, 3,3-dimethyl-5-chloroindolenine, 3,3,5-trimethylindolenine, and 3,3,7-trimethylindolenine); those of pyridine compounds (e.g. pyridine and 5-methylpyridine); those of benzimidazole compounds (e.g. 1-ethyl-5,6-dichlorobenzimidazole, 1-hydroxyethyl-5,6-dichlorobenzimidazole, 1-ethyl-5-chlorobenzimidazole, 1-ethyl-5,6-dibromobenzimidazole, 1-ethyl-5-phenylbenzimidazole, 1-ethyl-5-fluorobenzimidazole, 1-ethyl-5-cyanobenzimidazole, 1-($\beta$-acetoxyethyl)-5-cyanobenzimidazole, 1-ethyl-5-chloro-6-cyanobenzimidazole, 1-ethyl-5-fluoro-6-cyanobenzimidazole, 1-ethyl-5-acetylbenzimidazole, 1-ethyl-5-carboxybenzimidazole, 1-ethyl-5-ethoxycarbonylbenzimidazole, 1-ethyl-5-sulfamoylbenzimidazole, 1-ethyl-5-N-ethylsulfamoylbenzimidazole, 1-ethyl-5,6-difluorobenzimidazole, 1-ethyl-5,6-dicyanobenzimidazole, 1-ethyl-5-ethylsulfonylbenzimidazole, 1-ethyl-5-methylsulfonylbenzimidazole, 1-ethyl-5-trifluoromethylbenzimidazole, 1-ethyl-5-trifluoromethylsulfonylbenzimidazole, and 1-ethyl-5-trifluoromethylsulfinylbenzimidazole).

$Z_2$ is an atomic group necessary to form together with

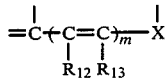

a substituted or unsubstituted pyrane, thiapyrane, selenapyrane, benzopyrane, benzothiapyrane, benzoselenapyrane, naphthopyrane, naphthothiapyrane, or naphthoselenapyrane ring. In the above formula (1), X is sulfur, oxygen, or selenium, and $R_{12}$ and $R_{13}$ are illustrated below.

$Z_3$ is a divalent hydrocarbon residue (e.g. —CH$_2$—CH$_2$—, —CH$_2$—CH$_2$—CH$_2$—,

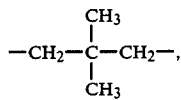

or —CH=CH—) necessary to form, together with

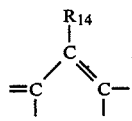

a substituted or unsubstituted 5- or 6-membered ring which can be condensed with a benzene ring or naphthalene ring.

$R_{11}$ is hydrogen, alkyl (e.g. methyl, ethyl, n-propyl, isopropyl, n-butyl, sec-butyl, isobutyl, tert-butyl, n-amyl, tert-amyl, n-hexyl, n-octyl, or tert-octyl), other alkyls such as substituted alkyl (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfate propyl, 4-sulfate butyl, N-(methylsulfonyl)carbamylmethyl, 3-(acetylsulfamoyl)propyl, and 4-(acetylsulfamoyl)butyl), cycloalkyl (e.g. cyclohexyl), allyl(CH$_2$=CH—CH$_2$—), aralkyl (e.g. benzyl, phenethyl, $\alpha$-naphthylmethyl, and $\beta$-naphthylmethyl), or substituted aralkyl (e.g. carboxybenzyl, sulfobenzyl, and hydroxybenzyl).

$R_{12}$ and $R_{13}$ each are (a) hydrogen, (b) halogen (Cl, Br, or I), or (c) an organic monovalent residue. Examples of the residue are:

(i) alkyls, particularly $C_1$–$C_{15}$ alkyls, e.g. methyl, ethyl, n-propyl, isopropyl, n-butyl, tert-butyl, n-amyl, isoamyl, hexyl, octyl, nonyl, and dodecyl;

(ii) alkoxyl, e.g. methoxy, ethoxy, propoxy, butoxy, amyloxy, hexoxy, and octoxy;

(iii) aryls: phenyl, $\alpha$-naphthyl, and $\beta$-naphthyl;

(iv) substituted aryls: tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, and dibenzylaminophenyl;

(v) styryl;

(vi) substituted styryls: methoxystyryl, dimethoxystyryl, ethoxystyryl, diethoxystyryl, dimethylaminostyryl, and diethylaminostyryl; and (vii) substituted or unsubstituted heterocyclic compound residues, e.g. 3-carbazolyl, 9-methyl-3-carbazolyl, 9-ethyl-3-carbazolyl, and 9-carbazolyl.

$R_{14}$ is hydrogen or halogen (e.g. Cl, Br, or I).

$A^\ominus$ is an anion, e.g. a chloride ion, bromide ion, iodide ion, perchlorate ion, benzenesulfonate ion, p-toluenesulfonate ion, methylsulfate ion, ethylsulfate ion, and propylsulfate ion, but nothing when $R_{11}$ itself contains an anion, e.g. —SO$_3^\ominus$, OSO$_3^\ominus$, —COO$^\ominus$, SO$_2^\ominus$NH—,

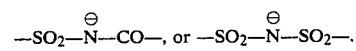

The notations m and n each are 0 or 1 and l is 0, 1, or 2.

The compound of the general formula (1) has a resonance hybrid of the general formula

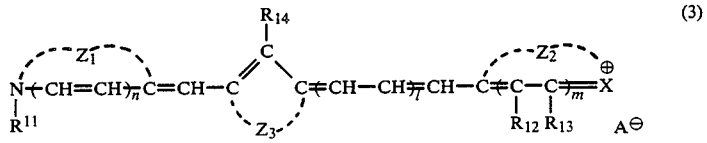

(3)

wherein $Z_1$, $Z_2$, $Z_3$, $R_{11}$, $R_{12}$, $R_{13}$, $R_{14}$, X, $A^\ominus$, l, m, and n are the same as those in the formula (1), except that $Z_2$ is an atomic group necessary to form together with

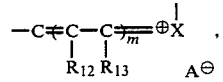

a substituted or unsubstituted pyrylium, thiapyrylium, selenapyrylium, benzopyrylium, benzothiapyrylium, benzoselenapyrylium, naphthopyrylium, naphthothiapyrylium, or naphthoselenapyrylium salt. This resonance hybrid is also included in the scope of this invention.

Secondly, the meaning of the notations in the general formula (2)

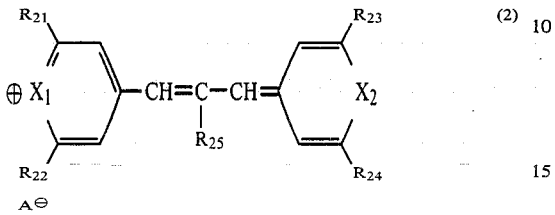

is illustrated.

$R_{21}$, $R_{22}$, $R_{23}$, and $R_{24}$ each are a substituted or unsubstituted aryl such as phenyl, tolyl, xylyl, chlorophenyl, methoxyphenyl, or naphyl or a substituted or unsubstituted heterocyclic compound residue such as 2-pyridyl, 3-pyridyl, 2-furyl, 2-thienyl, 2-thiazolyl, 3-carbazolyl, 2-quinolyl, 3-quinolyl, 2-imidazolyl, 2-lepidyl, 3-methoxy-2-pyridyl, 6-methyl-2-pyridyl, 4,5-dimethyl-2-thiazolyl, 4,5-diphenyl-2-thiazolyl, 4-phenyl-2-thiazolyl, or 9-ethyl-3-carbazolyl, with the proviso that at least one of $R_{21}$, $R_{22}$, $R_{23}$, and $R_{24}$ is said substituted or unsubstituted heterocyclic compound residue, $R_{25}$ is a hydrogen atom, alkyl such as methyl, ethyl, propyl, or butyl, or substituted or unsubstituted aryl such as phenyl, tolyl, xylyl, chlorophenyl, bromophenyl, or naphthyl. $X_1$ and $X_2$ each are oxygen, sulfur, or selenium atom. $A^\ominus$ is an anion such as a chloride ion, bromide ion, iodide ion, perchlorate ion, benzenesulfonate ion, p-toluenesulfonate ion, methylsulfate ion, ethylsulfate ion, or propylsulfate ion.

Typical examples of the compounds of the general formula (1) or (2) are listed below.

| Compound No. | Chemical formula |
|---|---|
| 1-(10) | 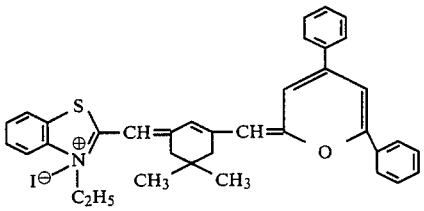 |
| 1-(11) | 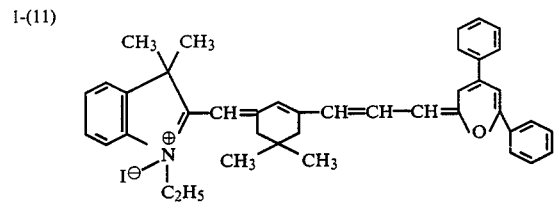 |
| 1-(12) | 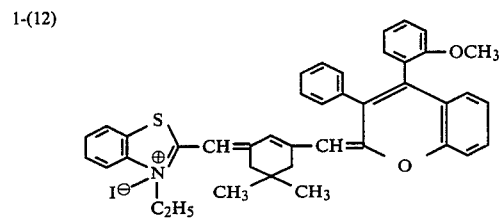 |
| 1-(13) | 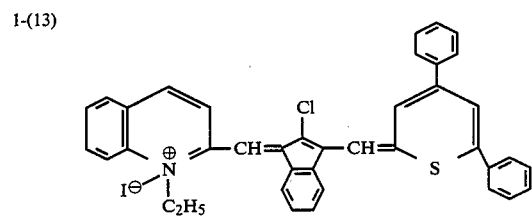 |
| 1-(14) | 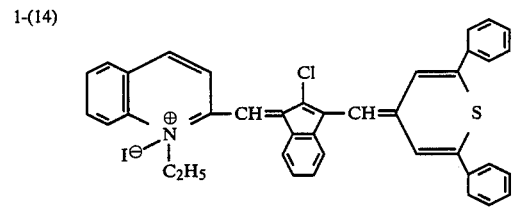 |
| 1-(15) | 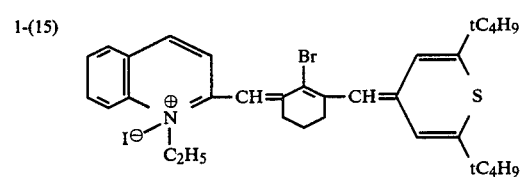 |
| 1-(16) | 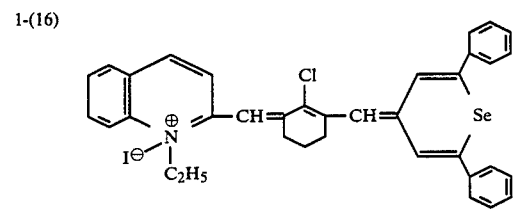 |
| 1-(17) | 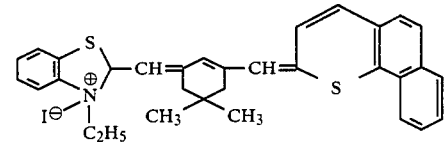 |

These cyanine compounds can be prepared by the method described in U.S. Pat. No. 2,734,900, as follows:

The compound of the formula (1) wherein l is 0 can be prepared by heating a compound represented by the general formula

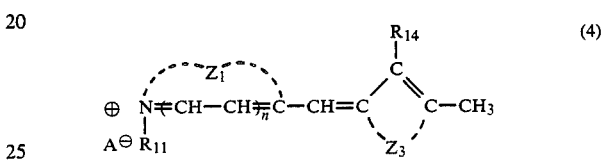 (4)

wherein $Z_1$, $Z_3$, $R_{11}$, $R_{14}$, $A^\ominus$, and n are the same as in the formula (1), and a compound of the following general formula (5) or (6) in a suitable solvent.

General formula (5):

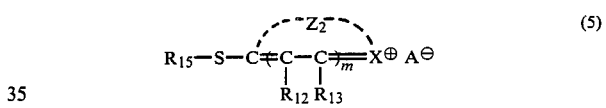 (5)

In this formula, $Z_2$, X, $R_{12}$, $R_{13}$, $A^\ominus$, and m are the same as in the formula (1) and $R_{15}$ is an alkyl such as methyl or ethyl.

General formula (6):

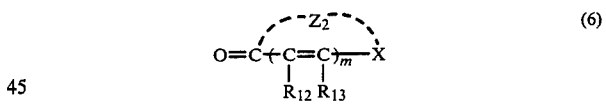 (6)

In this formula, $Z_2$, $R_{12}$, $R_{13}$, X, and m are the same as in the formula (1).

The compound of the formula (1) wherein l is 1 or 2 can be prepared by heating the compound of the above general formula (4) and a compound of the following general formula (7) in a suitable solevent.

General formula (7):

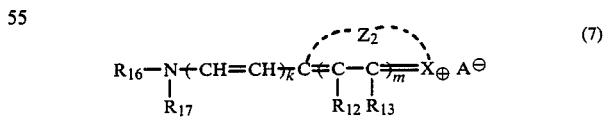 (7)

In this formula, $Z_2$, $R_{12}$, $R_{13}$, X, $A^\ominus$, and m are the same as in the formula (1), $R_{16}$ is an acyl such as acetyl, propionyl, or benzoyl, $R_{17}$ is a substituted or unsubstituted phenyl such as phenyl or tolyl, and k is 1 or 2.

The compound of the general formula (1) or (3) can form a co-crystalline complex with a polymer. This co-crystalline complex is also included in the scope of this invention.

| Compound No. | Chemical formula |
|---|---|
| 2-(1) | 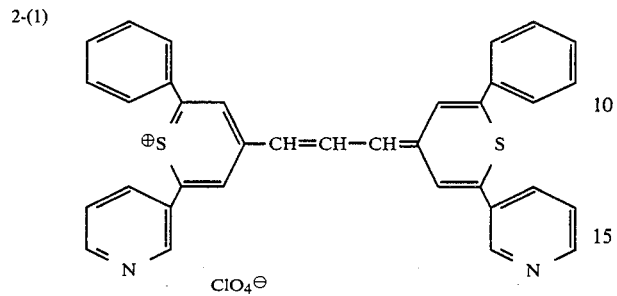 |
| 2-(2) | 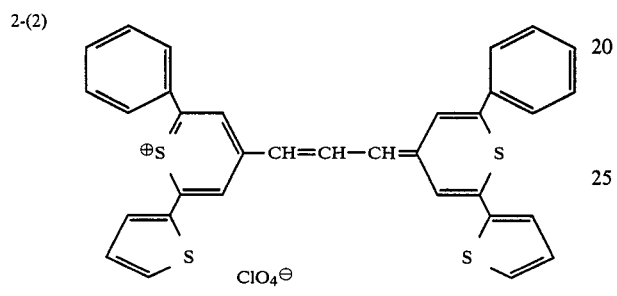 |
| 2-(3) | 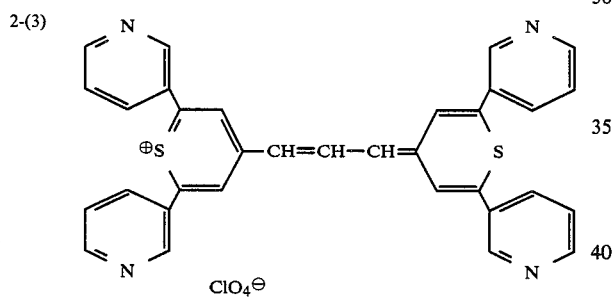 |
| 2-(4) | 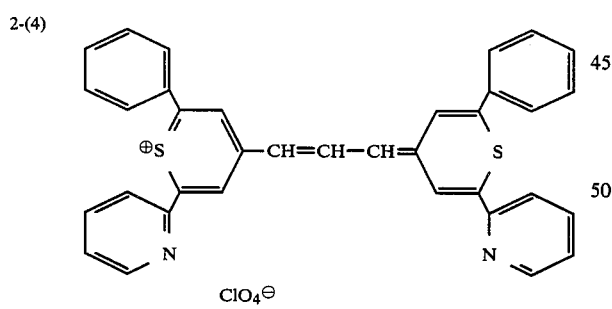 |
| 2-(5) | 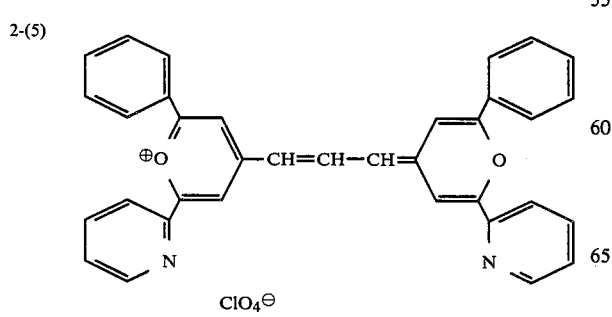 |
| 2-(10) | 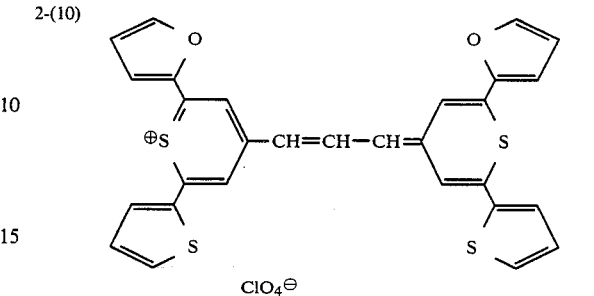 |
| 2-(11) | 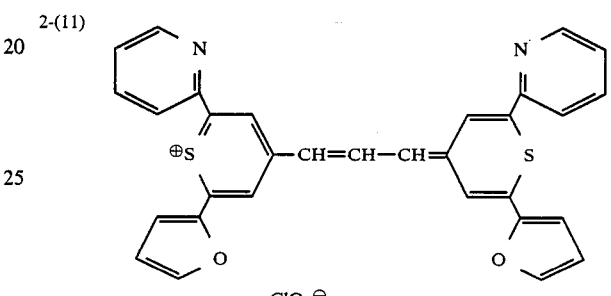 |
| 2-(12) | 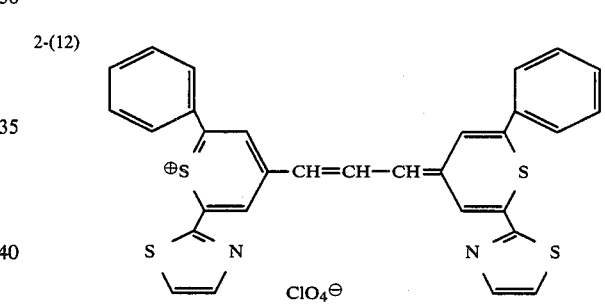 |
| 2-(13) | 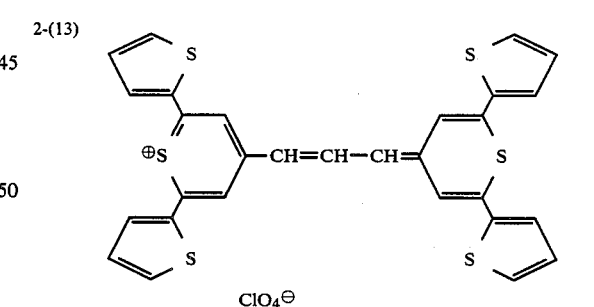 |
| 2-(14) | 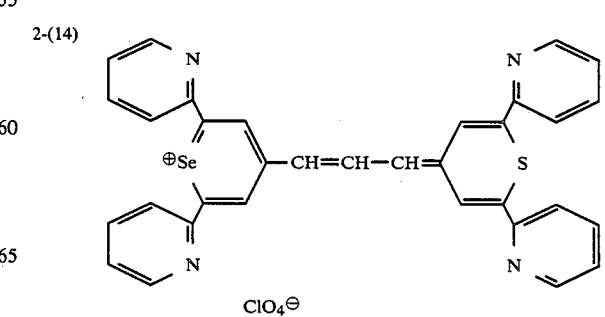 |

| Compound No. | Chemical formula |
|---|---|
| 2-(15) | 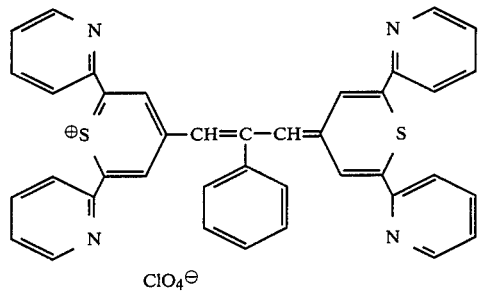 |
| 2-(16) | 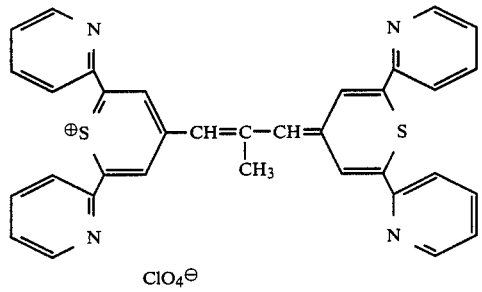 |
| 2-(17) | 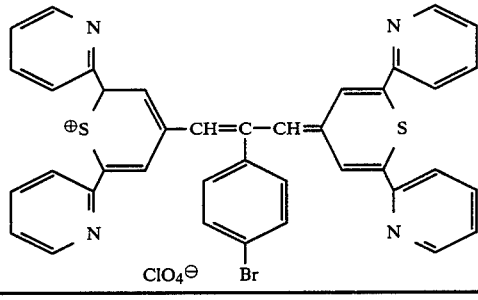 |

Among the compounds of the general formula (2), a symmetric type can be prepared by heating a compound of the general formula

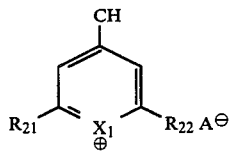

wherein $R_{21}$, $R_{22}$, $X_1$, and $A^\ominus$ are the same as in the formula (2), and a compound of the following general formula (9) or (10) in a suitable solvent.

General formula (9):

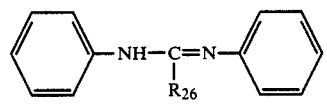 (9)

In this formula, $R_{26}$ is a hydrogen atom or an alkyl such as methyl, ethyl, propyl, or butyl.

General formula (10):

$$R_{27}-COCl \qquad (10)$$

In this formula, $R_{27}$ is a substituted or unsubstituted aryl such as phenyl, tolyl, xylyl, chlorophenyl, bromophenyl, or naphthyl.

Among the compounds of the general formula (2), an asymmetric type can be prepared by heating a compound of the general formula (8) and a compound of the following general formula (11) or (12) in a suitable solvent.

General formula (11):

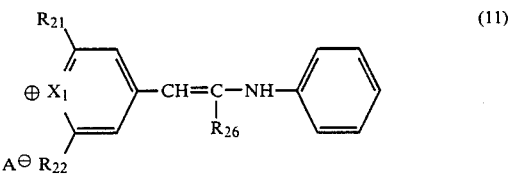 (11)

In this formula, $R_{21}$, $R_{22}$, $R_{26}$, $X_1$, and $A^\ominus$ are as defined above.

General formula (12):

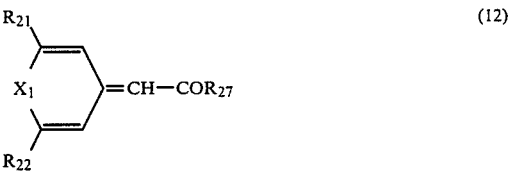 (12)

In this formula, $R_{21}$, $R_{22}$, $R_{27}$, and $X_1$ are as defined above.

The organic coating film of this invention, which is adaptable for a radiation (ultraviolet, visible, infrared, and laser rays)—sensitive member such as the optical disk or electrophotographic photosensitive member, can be formed as a recording medium, for example, an organic coat 2 formed on a substrate 1 as shown in FIG. 1. Such a film as the organic coat 2 can be formed by vacuum deposition of the compound of the formula (1) or (2) (a cyanine, pyrylium, thiapyrylium, or selenapyrylium compound) or application of a coating liquid comprising the above compound and a suitable binder. In this coating, the above compound may be contained in either dispersed or dissolved form in the coating liquid. The binder can be selected from a wide variety of resins. Suitable examples of the binder are cellulose esters such as nitrocellulose, cellulose phosphate, cellulose sulfate, cellulose acetate, cellulose propionate, cellulose butyrate, cellulose myristate, cellulose palmitate, cellulose acetate propionate, and cellulose acetate butyrate; cellulose ethers such as methyl cellulose, ethyl cellulose, propyl cellulose, and butyl cellulose; vinyl type resins such as polystyrene, poly(vinyl chloride), poly(vinyl acetate), poly(vinyl butyral), poly(vinyl acetal), poly(vinyl alcohol), and polyvinylpyrrolidone; such copolymers as styrene-butadiene, styrene-acrylonitrile, styrene-butadieneacrylonitrile, and vinyl chloride-vinyl acetate copolymers; acrylic resins such as poly(methyl methacrylate), poly(methyl acrylate), poly(butyl acrylate, poly(acrylic acid), poly(methacrylic acid), polyacrylamide, and polyacrylonitrile; polyester resins such as poly(ethylene terephthalate); polyarylate resins such as poly(4,4'-isopropylidenediphenylene-co-1,4-cyclohexylenedimethylene carbonate), poly(ethylenedioxy-3,3'-phenylene thiocarbonate), poly(4,4'-isopropylidenediphenylene carbonate-co-terephthalate, poly(4,4'-isopropylidenediphenylene carbonate), poly(4,4'-sec-butylidenediphenylene carbonate), and poly(4,4'-isopropylidenediphenylene carbonate-block-oxyethylene); and other miscellaneous resins such as polyamides, polyimides, epoxy resins, phenolic resins, and polyolefins (e.g. polyethylene, polypropylene, and chlorinated polyethylene).

The organic solvent usable for the coating liquid varies depending upon the type of the binder and the desired form of the above compound, dispersed or dissolved in the coating liquid. Generally, the usable solvents include; alcohols such as methanol, ethanol, and isopropanol; ketones such as acetone, methyl ethyl ketone, and cyclohexanone; amides such as N,N-dimethylformamide and N,N-dimethylacetamide; sulfoxides such as dimethylsulfoxide; ethers such as tetrahydrofuran, dioxane, and ethylene glycol monomethyl ether; esters such as methyl acetate, ethyl acetate, and butyl acetate; halogenated aliphatic hydrocarbons such as chloroform, methylene chloride, dichloroethylene, carbon tetrachloride, and trichloroethylene; and aromatic hydrocarbons or halogenated aromatic hydrocarbons such as benzene, toluene, xylene, ligroin, monochlorobenzene, and dichlorobenzene.

The coating can be carried out by various methods such as the dip coating, spray coating, spinner coating, bead coating, Meyer bar coating, blade coating, roller coating, and curtain coating methods.

Content of the cyanine, pyrylium, thiapyrylium, or selenapyrylium in the organic coating film 2 is 1–90%, preferably 20–70%, by weight. Thickness of the organic coating film 2 dried or vapor-deposited is $10\mu$ or less, preferably $2\mu$ or less.

Materials usable as the substrate 1 are plastics such as polyesters, acrylic resins, polyolefin resins, phenolic resins, epoxy resins, polyamides, and polyimides, glass, and metals.

Figure 2:
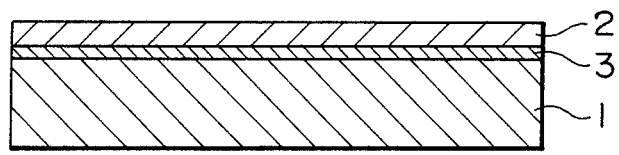
Figure 3:
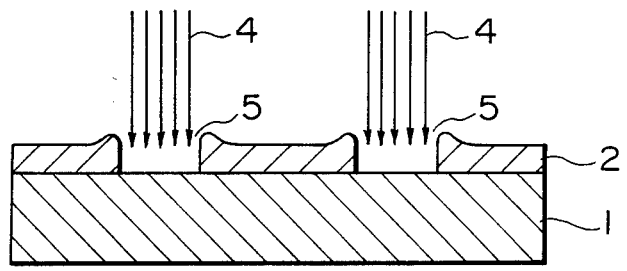
FIG. 3 is an illustration showing recording of the optical disk of FIG. 1.

In this invention, a reflecting layer 3 can be laid between the disk substrate 1 and the organic coating film 2 as shown in FIG. 2. This reflecting layer 3 can be formed by vapor deposition or lamination of a reflective metal, e.g. aluminum, silver, or chromium.

In the organic coating film 2, pits 5 can be formed by irradiating it with a converged laser beam 4 as shown in FIG. 4. Higher reflectance at the pits can be obtained by making the depth of the pits equal to the thickness of the organic coating film 2. When a laser beam of the same wavelength but lower intensity than the writing laser beam is used for reading the recorded information, the reading beam is reflected highly at the pits and absorbed at the pit-less area. Another method for recording and reproduction is that real-time writing is conducted with a laser beam of a certain wavelength and the reading is carried out with such a laser beam of different wavelength as to penetrate the organic coating film 2 substantially. The reading laser beam can respond to the change caused in the phase of the reflected beam by the difference in film thickness between the pit and the pit-less area.

Recording in the organic coating film of this invention can be accomplished by the irradiation with a gas laser beam such as an argon laser beam ($\lambda$ 488 nm), helium-neon laser beam ($\lambda$ 633 nm), or helium-cadmium laser beam ($\lambda$ 442 nm), but is preferably carried out with a laser beam of wavelength 750 nm or longer, particularly with a laser beam, such as a gallium-aluminum-arsenic semiconductor laser beam ($\lambda$ 780 nm), the wavelength of which lies in the near-infrared or infrared region. For the purpose of the reading, the above beams of semiconductor lasers and gas lasers can be used. In this case, the wavelengths of the beams may be the same or different for writing and reading.

In another embodiment of this invention, the present organic coating film is adaptable as a photosensitive layer of the electrophotographic photosensitive member. This film can also be used as the charge generation layer of an electrophotographic photosensitive member of which the photosensitive layer has been divided into two layers which respectively perform functions as a charge generation layer and a charge transport layer.

The charge generation layer is desired to contain the photoconductive compounds of the formula (1) or (2) as much as possible to absorb a sufficient quantity of light and is also desired to be as thin as $5\mu$ or less, preferably $0.01-1\mu$, for the purpose of shortening the distance necessary for generated charge carriers to reach the charge transport layer. This results from that the charge generation layer needs to absorb most of the incident light and generate many charge carriers and further that the generated charge carriers need to be injected into the charge transport layer without being deactivated by the recombination or trapping.

The charge generation layer can be formed by coating a dispersion of the above compounds in a suitable binder solution on a substrate or by vapor-deposition of the compounds in a vacuum evaporation apparatus. The binder used for this coating can be selected from a wide variety of insulating resins and from organic photoconductive polymers such as poly(N-vinylcarbazole, polyvinylanthracene, and polyvinylpyrene. Preferred examples of the binder are insulating resins such as poly(vinyl butyral), polycarbonates, polyesters, polystyrene, phenoxy resins, poly(vinyl acetate), acrylic resins, polyacrylamide, polyamides, polyvinylpyridine, cellulosic resins, urethane resins, epoxy resins, styrene-acrylonitrile copolymer, styrene-butadiene copolymer, casein, poly(vinyl alcohol), and polyvinylpyrrolidone. Content of the binder resin in the charge generation layer is up to 80%, preferably up to 40%, by weight.

Solvents suitable for dissolving these binder resins vary depending upon the type of the resin and are selected from organic solvents not dissolving the following charge transport layer or subbing layer. Examples of the organic solvents are; alcohols such as methanol, ethanol, and isopropanol; ketones such as acetone, methyl ethyl ketone, and cyclohexanone; amides such as N,N-dimethylformamide and N,N-dimethylacetamide; sulfoxides such as dimethylsulfoxide; ethers such as tetrahydrofuran, dioxane, and ethylene glycol monomethyl ether; esters such as methyl acetate and ethyl acetate; halogenated aliphatic hydrocarbons such as chloroform, methylene chloride, dichloroethylene, carbon tetrachloride, and trichloroethylene; and aromatic hydrocarbons or halogenated aromatic hydrocarbons such as benzene, toluene, xylene, ligroin, monochlorobenzene, and dichlorobenzene.

Coating methods applicable in this case include the dip coating, spray coating, spinner coating, bead coating, Meyer bar coating, blade coating, roller coating, curtain coating, etc. Preferably, the coat is dried by heating after set to touch. This heat drying may be carried out at a temperature of 30°–200° C. for a period of 5 minutes–2 hours with or without blowing air.

The charge transport layer is in electrical communication with the charge generation layer and has the function of receiving the charge carries injected from the charge generation, in the presence of an electric field and the function of transporting the carriers to its surface. The charge transport layer may be laid on the upper or lower side of the charge generation layer, but preferably on the upper side.

The material for transporting the charge carriers in the charge transport layer (hereinafter this material is referred to as a charge-transporting material) is desired to be substantially non-sensitive to the laser beam to which the charge generation layer is sensitive.

The charge-transporting materials are divided into electron-transporting materials and hole-transporting materials.

The electron-transporting materials include electron attractive substances such as chloranil, bromanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, and 2,4,8-trinitrothioxanthone and polymers derived from these compounds.

The hole-transporting materials include pyrene, N-ethylcarbazole, N-isopropylcarbazole, N-methyl-N-phenylhydrozine-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine; hydrozones such as p-diethylaminobenzaldehyde-N,N-diphenylhydrazone, p-diethylaminobenzaldehyde-N-α-naphthyl-N-phenylhydrazone, 4-(N-pyrrolidinyl)benzaldehyde-N,N-diphenylhydrazone, 1,3,3-trimethylindoleine-ω-aldehyde-N,N-diphenylhydrazone, and p-diethylbenzaldehyde-3-methylbenzthiazolinone-2-hydrozone; 2,5-bis(p-diethylaminophenyl)-1,3,4-oxadiazole; pyrazolines such as 1-phenyl-3-(p-diethylaminostyryl)-5-(p-diethylaminophenyl)pyrazoline, 1-[quinolyl(2)]-3-(p-diethylaminostyryl)-5-(p-diethylaminophenyl)pyrazoline, 1-[pyridyl(2)]-3-(p-diethylaminostyryl)-5-(p-diethylaminophenyl)pyrazoline, 1-[6-methoxypyridyl(2)]-3-(p-diethylaminostyryl)-5-(p-diethylaminophenyl)-pyrazoline, 1-[pyridyl(3)]-3-(p-diethylaminostyryl)-5-(p-diethylaminophenyl)pyrazoline, 1-[lepidyl(2)]-3-(p-diethylaminostyryl)-5-(p-diethylaminophenyl)pyrazoline, 1-[pyridyl(2)]-3-(p-diethylaminostyryl)-4-methyl-5-(p-diethylaminophenyl)pyrazoline, 1-[pyridyl(2)]-3-(α-methyl-p-diethylaminostyryl)-5-(p-diethylaminophenyl)pyrazoline, 1-phenyl-3-(p-diethylaminostyryl)-4-methyl-5-(p-diethylaminophenyl)pyrazoline, 1-phenyl-3-(α-benzyl-p-diethylaminostyryl)-5-(p-diethylaminophenyl)pyrazoline, and spiropyrazoline; oxazole compounds such as 2-(p-diethylaminostyryl)-6-diethylaminobenzoxazole and 2-(p-diethylaminophenyl)-4-(p-dimethylaminophenyl-5-(2-chlorophenyl)oxazole; thiazole compounds such as 2-(p-diethylaminostyryl)-6-diethylbenzothiazole; triarylmethane compounds such as bis(4-diethylamino-2-methylphenyl)phenylmethane; polyarylalkanes such as 1,1-bis(4-N,N-diethylamino-2-methylphenyl)heptane and 1,1,2,2-tetrakis(4-N,N-diethylamino-2-methylphenyl)ethane; triphenylamine; poly(N-vinylcarbazole), polyvinylpyrene, polyvinylanthracene, polyvinylacridine, poly(9-vinylphenylanthracene), pyrene-formaldehyde resin, and ethylcarbazole-formaldehyde resin.

Besides these organic charge-transporting materials, inorganic materials such as selenium, selenium-tellurium, amorphous silicon, and cadmium sulfide can be used in the charge transport layer.

These charge-transporting materials can be used individually or in combination.

When the charge-transporting material to be used does not have the film-forming property, a coating film can be formed therefrom by incorporating a suitable binder. Resins usable as the binder include insulating resins, e.g. acrylic resins, polyarylate, polyesters, polycarbonates, polystyrene, acrylonitrile-styrene copolymer, acrylonitrile-butadiene copolymer, poly(vinyl butyral), poly(vinyl formal), polysulfone, polyacrylamide, polyamides, and chlorinated rubber and organic photoconductive polymers, e.g. poly(N-vinylcarbazole), polyvinylanthracene, and polyvinyl-pyrene.

The charge transport layer cannot be made thicker than is necessary, since the distance of transporting charge carriers has a limitation. Thickness thereof ranges generally from 5 to 30μ, preferably from 8 to 20μ. Suitable coating methods as mentioned above can be applied to form the charge transport layer.

The photosensitive layer having a laminate structure comprising these charge generation and charge transport layers is laid on a substrate having electric conductivity. Such conductive substrates can be formed with materials having the conductivity in themselves, e.g. aluminum, aluminum alloy, copper, zinc, stainless steel, vanadium, molybdenum, chromium, titanium, nickel, indium, gold, and platinum. Further, the substrates include; films or sheets of plastics (e.g. polyethylene, polypropylene, poly(vinyl chloride), poly(ethylene terephthalate), acrylic resins, and polyfluoroethylene) covered by vacuum deposition method with a film of aluminum, aluminum alloy, indium oxide, tin oxide-indium oxide, or tin oxide alloy; those of plastics coated by conductive particles (e.g. carbon black or silver particles) together with a suitable binder; those of plastics and paper impregnated with conductive particles; and those of conductive polymers.

A subbing layer which functions as a barrier and as an adhesive can also be laid between the conductive layer and the photosensitive layer. The subbing layer can be formed with, e.g. casein, poly(vinyl alcohol), nitrocellulose, ethylene-acrylic acid copolymer, polyamides (nylon 6, nylon 66, nylon 610, nylon copolymer or alkoxymethylated nylon), polyurethanes, gelatin, or aluminum oxide.

Suitable thickness of the subbing layer is 0.1-5μ, preferably 0.5-3μ.

When operating the photosensitive member comprising a conductive layer, charge generation layer, and charge transport layer laminated in that order, it is necessary to charge positively the surface of the charge transport layer if its charge-transporting material is electron-transporting. On image exposure of the photosensitive member after charging, electrons generated in the charge generation layer, in the exposed areas, are injected into the charge transport layer, then arrive at the surface, and neutralize the positive charge to decay the surface potential, thus producing there an electrostatic contrast to the unexposed areas. The thus produced electrostatic latent images, on development with a negative-working toner, turn into visible images, which can be fixed directly or after being transferred to paper or a plastic film.

It is also possible that the electrostatic latent images formed on the photosensitive member are transferred to the insulation layer of transfer paper, then developed, and fixed. Any of known developing agents, development processes, and fixing processes may be adopted, viz. there are no particular restrictions thereupon.

On the other hand, if the charge-transporting material is hole-transporting, the surface of the charge transport layer needs to be negatively charged for operating the photosensitive member. On image exposure of the photosensitive member after charging, holes produced in the charge generation layer, in the exposed areas, are injected into the charge transport layer, then arrive at the surface, and neutralize the negative charge to decay the surface potential, thus producing there an electrostatic contrast to the unexposed areas. For developing this, the use of a positive-working toner is necessary contrary to the case where the charge transporting material is electron-transporting.

In another embodiment of this invention, the cyanine, pyrylium, thiapyrylium, or selenapyrylium compound of the formula (1) or (2) can be contained in the organic coating film, as a sensitizer for the above-cited organic photoconductive materials such as hydrazone, pyrazolines, oxazoles, thiazole, triarylmethane, polyarylalkanes, triphenylamine, and poly(N-vinylcarbazole) or for inorganic photoconductive materials such as zinc oxide, cadmium sulfide, and selenium. This organic film can be formed by coating a mixture of such a photoconductive material, the compound of the formula (1) or (2), a binder, and a solvent. In another embodiment of this invention, an organic coating film containing the cyanine, pyrylium, thiapyrylium, or selenapyrylium compound of the formula (1) or (2) can be used as a photosensitive layer.

Any of the photosensitive members described above contains at least one of the cyanine, pyrylium, thiapyrylium, or selenapyrylium compounds of the formula (1) or (2), wherein a charge-generating material selected from known dyes and pigments can be used optionally jointly.

The organic coating film of this invention can also be used for infrared ray cutting filters, solar cells, and photosensors, besides as a laser-sensitive coat for optical recording disks and electrophotographic photosensitive members. A solar cell can be prepared, for example, by sandwiching the organic film between an indium oxide electrode and an aluminum electrode.

The organic coating film of this invention can be made highly sensitive to rays of wavelength 750 nm or longer, as compared with the laser-operative electrophotographic photosensitive member of the prior art, and also is highly sensitive and sufficiently improved in S/N ratio, as compared with the optical recording disk of the prior art. Moreover, the compound of the formula (1) or (2), used in this invention, has the advantage of extremely high stability to heat, in spite of its absorption peak present in a region of wavelengths longer than 750 nm.

This invention is illustrated in more detail with reference to the following Examples: In the Examples, "parts" are all by weight.

EXAMPLE 1

A solution of casein in aqueous ammonia (casein 11.2 g, 28% aqueous ammonia 1 g, water 222 ml) was applied on an aluminum cylinder by the dip coating method and dried to form a subbing layer of 1.0 g/m² in coating weight.

The above listed compound No. 1-(1), a cyanine compound of the formula (1), (1 part), a vinyl butyral resin (Eslex BM-2, made by Sekisui Chemical Co., Ltd.) (1 part), and tetrahydrofuran (30 parts) were ball-milled for 4 hours to prepare a dispersion. It was applied on the subbing layer by the dip coating method and dried to form a charge generation layer $0.3\mu$ thick.

A mixture of p-diethylaminobenzaldehyde-N-phenyl-N-$\alpha$-naphthylhydrazone (1 part), a polysulfone resin (P 1700, made by Union Carbide Corp.) (1 part), and monochlorobenzene (6 parts) was stirred to give a solution. The solution was applied on the charge generation layer by the dip coating method and dried to form a charge transport layer $12\mu$ thick.

The thus prepared photosensitive member was charged by a corona discharge at $-5$ KV and the resulting surface potential (original potential Vo) and then the surface potential after 5-second standing in the dark (dark decayed potential $V_5$) were measured. The sensitivity was evaluated by measuring the exposure quantity for halving the dark decayed potential $V_5$ (E $\frac{1}{2}$ microjoule/cm²), wherein a gallium-aluminum-arsenic semiconductor laser (wavelength 780 nm) was used as a light source.

Results of these measurements were as follows:
$V_o$: $-620$ V
$V_5$: $-580$ V
E $\frac{1}{2}$: 8.5 microjoule/cm²

In the following Examples relating to electrophotographic photosensitive members, these charge bearing characteristics were determined as described above, unless otherwise noted.

EXAMPLES 2–17

Photosensitive members were prepared in the same manner as in Example 1 but using separately the compounds shown in Table 1 in place of the compound No. 1-(1). Charge bearing characteristics of these photosensitive members are shown in Table 1.

TABLE 1

| Example No. | No. of cyanine compound of Formula (1) | $V_o$ (−V) | $V_5$ (−V) | E$\frac{1}{2}$ (microjoule/cm²) |
|---|---|---|---|---|
| 2 | 1-(2) | 570 | 510 | 25.0 |
| 3 | 1-(3) | 570 | 500 | 7.8 |
| 4 | 1-(4) | 590 | 540 | 10.5 |
| 5 | 1-(5) | 580 | 530 | 14.0 |
| 6 | 1-(6) | 600 | 550 | 9.8 |
| 7 | 1-(7) | 580 | 520 | 9.0 |
| 8 | 1-(8) | 560 | 520 | 17.5 |
| 9 | 1-(9) | 570 | 520 | 11.3 |
| 10 | 1-(10) | 610 | 550 | 15.0 |
| 11 | 1-(11) | 590 | 550 | 9.4 |
| 12 | 1-(12) | 570 | 530 | 22.0 |
| 13 | 1-(13) | 560 | 510 | 29.4 |
| 14 | 1-(14) | 570 | 510 | 13.5 |
| 15 | 1-(15) | 590 | 570 | 8.5 |
| 16 | 1-(16) | 580 | 530 | 16.4 |
| 17 | 1-(17) | 550 | 500 | 33.0 |

EXAMPLE 18

A solution of casein in aqueous ammonia was applied on a 100-$\mu$ thick aluminum plate and dried to form a subbing layer 1.1$\mu$ thick.

A charge transfer complex was prepared by dissolving 2,4,7-trinitro-9-fluorenone (5 g) and a poly(N-vinyl-carbazole) (number average mol. wt. 300,000) (5 g) in tetrahydrofuran (70 ml). The complex and the compound No. 1-(1) (5 g) were dispersed in a solution prepared by dissolving a polyester resin (Vylon, made by Toyobo Co., Ltd.) (5 g) in tetrahydrofuran (70 ml). The resulting dispersion was applied on the subbing layer and dried to form a photosensitive layer 12μ thick. Charge bearing characteristics (measured through positive charging) of the thus prepared photosensitive member were as follows:

$V_0$: +550 V
$V_5$: +490 V
$E \frac{1}{2}$: 4.85 microjoule/cm$^2$

EXAMPLE 19

The aluminum surface of vapor-aluminized poly(ethylene terephthalate) film was coated with a poly(vinyl alcohol) film of 1.1μ in thickness.

The same dispersion of the compound No. 1-(1) as used in Example 1 was applied on the poly(vinyl alcohol) film by means of a Meyer bar and dried to form a charge generation layer 0.5μ thick.

A solution prepared by dissolving a pyrazoline compound (5 g) of the formula

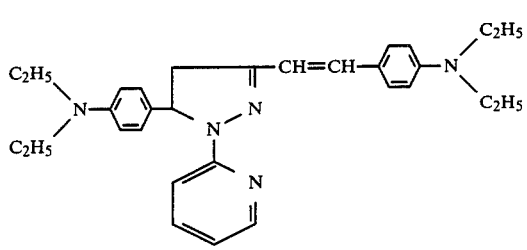

and a polyarylate resin (a polycondensation product of bisphenol A with a terephthalic acid-isophthalic acid mixture) (5 g) in tetrahydrofuran (70 ml) was applied on the charge generation layer and dried to form a charge transport layer 10μ thick.

Charge bearing characteristics of the thus prepared photosensitive member were as follows:

$V_0$: −580 V
$V_5$: −520 V
$E\frac{1}{2}$: 10.5 microjoule/cm$^2$

As can be seen from the foregoing Examples, the electrophotographic photosensitive members of this invention have markedly high spectral sensitivity in a region of wavelengths of 750 nm or longer and are excellent in charge bearing characteristics such as the original potential and the dark decay potential.

EXAMPLE 20

The compound No. 1-(1) (3 parts) was throughly dispersed in a nitrocellulose solution (OH-less lacquer: methyl ethyl ketone dissolving 25 wt % nitrocellulose, made by Daicel Chem. Ind. Co., Ltd.) (12 parts) diluted with methyl ethyl ketone (70 parts). The dispersion was applied by the dip coating method on the aluminum surface of a vapor-aluminized glass disk and was dried to form a recording layer of 0.6 g/m$^2$.

The thus obtained optical recording disk was set on a turntable. While the turntable was rotated at a speed of 1800 rpm with a motor, a track of pits was formed on the disk by irradiating it with a 5 mW, 4 MHz gallium-aluminum-arsenic semiconductor laser beam (λ 780 nm) which had been converged to a spot size of 1.0μ.

On scanning electron microscopic examination, distinct pits were observed on the irradiated surface of the optical disk. The track of pits was traced with a low-power gallium-aluminum-arsenic semiconductor laser beam, and the reflected beam was detected, indicating waveform with sufficiently high S/N ratios.

EXAMPLE 21

The compound No. 1-(1) (500 mg) was placed in a molybdenum boat and vapor-deposited, in a vacuum chamber once evacuated to a pressure of $1 \times 10^{-6}$ mmHg or lower, on the aluminum surface of a vapor-aluminized glass disk. During the vapor deposition, the pressure in the vacuum chamber was controlled with a heater so as not to rise above $10^{-5}$ mmHg. Thus, a vapor deposition film 0.2μ thick was formed on the aluminum surface.

Information was recorded on the thus prepared optical recording disk, in the same manner as in Example 20. As a result, distinct pits similar to those in Example 20 was observed on the disk. The information was reproduced in the same manner as in Example 20, giving waveform with sufficiently high S/N ratios.

EXAMPLE 22

In the same manner as in Example 20, the aluminum surface of a vapor-aluminized glass disk was coated with the compound No. 1-(5) to form an optical recording disk having a recording layer of 0.6 g/m$^2$ in dry coating weight.

Information was recorded on this optical recording disk and then reproduced, in the same manner as in Example 20. As a result, waveform was obtained with sufficiently high S/N ratios. Scanning electron microscopic examination of the recording layer surface, after writing the information, indicated the formation of distinct pits.

EXAMPLE 23

In the same manner as in Example 20, the aluminum surface of a vapor-aluminized glass disk was coated with the compound No. 1-(8) to form an optical recording disk having a recording layer of 0.6 g/m$^2$ in dry coating weight.

Information was recorded on this optical recording disk and then reproduced, in the same manner as in Example 20. As a result, waveform was obtained with sufficiently high S/N ratios. Scanning electron microscopic examination of the recording layer surface, after writing the information, indicated the formation of distinct pits.

EXAMPLE 24

In the same manner as in Example 20, the aluminum surface of a vapor-aluminized glass disk was coated with the compound No. 1-(14) to form an optical recording disk having a recording layer of 0.6 g/m$^2$ in dry coating weight.

Information was recorded on this optical recording disk and then reproduced, in the same manner as in Example 20. As a result, waveform was obtained with sufficiently high S/N ratios. Scanning electron microscopic examination of the recording layer surface, after writing the information indicated the formation of distinct bits.

EXAMPLE 25

A solution of casein in aqueous ammonia (casein 11.2 g, 28% aqueous ammonia 1 g, water 222 ml) was applied on an aluminum cylinder by the dip coating method and dried to form a subbing layer of 1.0 g/m$^2$ in coating weight.

The compound No. 2-(1), a thiapyrylium compound of the formula (2), (1 part), a vinyl butyral resin (Eslex BM-2, made by Sekisui Chemical Co., Ltd.), and isopropanol (30 parts) were ball-milled for 4 hours to prepare a dispersion. It was applied on the subbing layer by the dip coating method and dried to form a charge generation layer 0.3μ thick.

A mixture of p-diethylaminobenzaldehyde-N-phenyl-N-α-naphthylhydrazone (1 part), a polysulfone resin (P 1700, made by Union Carbide Corp.) (1 part), and monochlorobenzene (6 parts) was stirred to give a solution. The solution was applied on the charge generation layer by the dip coating method and dried to form a charge transport layer 12μ thick.

Charge bearing characteristics of the thus prepared photosensitive member were as follows:
$V_O$: −610 V
$V_5$: −560 V
$E_{\frac{1}{2}}$: 10.4 microjoule/cm$^2$

EXAMPLES 26–36

Photosensitive members were prepared in the same manner as in Example 25 but using separately the pyrylium or thiapyrylium compounds shown in Table 2 in place of the thiapyrylium compound No. 2-(1). Charge bearing characteristics of these photosensitive members are shown in Table 2.

TABLE 2

| Example No. | No. of thiapyrylium compound of Formula (2) | $V_O$ (−V) | $V_5$ (−V) | $E_{\frac{1}{2}}$ (microjoule/cm$^2$) |
|---|---|---|---|---|
| 26 | 2-(3) | 580 | 510 | 18.5 |
| 27 | 2-(5) | 570 | 520 | 24.0 |
| 28 | 2-(6) | 590 | 510 | 16.0 |
| 29 | 2-(8) | 570 | 510 | 21.0 |
| 30 | 2-(9) | 560 | 510 | 14.0 |
| 31 | 2-(10) | 580 | 540 | 15.4 |
| 32 | 2-(11) | 570 | 530 | 17.0 |
| 33 | 2-(13) | 580 | 530 | 28.0 |
| 34 | 2-(15) | 590 | 540 | 13.0 |
| 35 | 2-(16) | 560 | 520 | 28.0 |
| 36 | 2-(17) | 570 | 520 | 20.4 |

EXAMPLE 37

A solution of casein in aqueous ammonia was applied on a 100-μ thick aluminum plate and dried to form a subbing layer 1.1μ thick.

The thiapyrylium compound No. 2-(3) (1 g) and a solution of a polyester resin (Vylon, made by Toyobo Co., Ltd.) (5 g) in tetrahydrofuran (70 ml) were added to a solution of poly(N-vinylcarbazole) (number average mol. wt. 300,000) (5 g) in tetrahydrofuran (70 ml) to form a dispersion. The dispersion was applied on the subbing layer and dried to form a photosensitive layer 21μ thick.

Charge bearing characteristics of the thus prepared photosensitive member were as follows:
$V_O$: −610 V
$V_5$: −570 V
$E_{\frac{1}{2}}$: 21 microjoule/cm$^2$

EXAMPLE 38

The pyrylium compound No. 2-(5) (5g), p-diethylaminobenzaldehyde-N,N-diphenylhydrazone (5 g), and polystyrene (12 g) were dissolved in dichloromethane (250 ml). The solution was applied by the dip coating method on an aluminum cylinder having a casein subbing layer, so as to give a dry thickness of 20μ. This coating layer was exposed to p-dioxane vapor and then dried to prepare a photosensitive drum.

Charge bearing characteristics of this photosensitive drum were as follows:
$V_O$: −590 V
$V_5$: −520 V
$E_{\frac{1}{2}}$: 21 microjoule/cm$^2$

EXAMPLE 39

A photosensitive drum was prepared in the same manner as in Example 38 but using the thiapyrylium compound No. 2-(15) in place of the pyrylium compound, No. 2-(5). Charge bearing characteristics of this photosensitive drum were as follows:
$V_O$: −570 V
$V_5$: −510 V
$E_{\frac{1}{2}}$: 15 microjoule/cm$^2$

EXAMPLE 40

The thiapyrylium compound No. 2-(1) (5 g) and polystyrene (5 g) were dissolved in dichloromethane (170 ml). This solution was applied by the dip coating method on an aluminum cylinder having a casein subbing layer, so as to give a dry thickness of 0.7μ. This coating layer was exposed to p-dioxane vapor and then dried to form a charge generation layer.

A solution of 1-phenyl-3-(p-diethylaminostyryl)-5-(p-diethylaminophenyl)pyrazoline (5 g) and a poly(4,4'-dioxydiphenyl-2,2-propane carbonate) (mol. wt. 30,000) (5 g) in tetrahydrofuran (70 ml) was applied on the charge generation layer and dried to form a charge transport layer 10μ thick.

Charge bearing characteristics of the thus prepared photosensitive drum were as follows:
$V_O$: −570 V
$V_5$: −540 V
$E_{\frac{1}{2}}$: 12.0 microjoule/cm$^2$

EXAMPLE 41

A photosensitive drum was prepared in the same manner as in Example 40 but using the thiapyrylium compound No. 2-(15) in place of the thiapyrylium compound No. 2-(1). Charge bearing characteristics of this photosensitive drum were as follows:
$V_O$: −610 V
$V_5$: −530 V
$E_{\frac{1}{2}}$: 11.4 microjoule/cm$^2$ As can be seen from the foregoing Examples, the electrophotographic photosensitive member of this invention has markedly high spectral sensitivity in a region of wavelengths of 750 nm or longer and is excellent in charge bearing characteristics such as the original potential and the dark decayed potential.

EXAMPLE 42

The thiapyrylium compound, No. 2-(1) (3 parts) was thoroughly dispersed in a nitrocellulose solution (OH-less lacquer: methyl ethyl ketone dissolving 2.5 wt % nitrocellulose, made by Daicel Chem. Ind. Co., Ltd.) (12 parts) diluted with methyl ethyl ketone (70 parts). The dispersion was applied by the dip coating method on the aluminum surface of a vapor-aluminized glass disk and was dried to form a recording layer of 0.6 g/m$^2$.

The thus prepared optical recording disk was set on a turntable. While the turntable was rotated at a speed of 1800 rpm with a motor, a track of pits was formed on the disk by irradiating with 5 mW, 8 MHz gallium-aluminum-arsenic semiconductor laser beam (λ 780 nm) which had been converged to a spot size of 1.0μ.

On scanning electron microscopic examination, distinct pits were observed on the irradiated surface of the optical disk. The track of pits was traced with a low-power gallium-aluminum-arsenic semi-conductor laser beam, the reflected beam was detected, giving waveform with sufficiently high S/N ratios.

EXAMPLE 43

The thiapyrylium compound No. 2-(6) (500 mg) was placed in a molybdenum boat and vapor-deposited, in a vacuum chamber once evacuated to a pressure of $1 \times 10^{-6}$ mmHg or lower, on the aluminum surface of a vapor-aluminized glass disk. During the vapor deposition, the pressure in the vacuum chamber was controlled with a heater so as not to rise about $10^{-5}$ mmHg. Thus, a vapor deposition film $0.2\mu$ thick was formed on the aluminum surface.

Information was recorded on the thus prepared optical recording disk in the same manner as in Example 42. As a result, distinct pits similar to those in Example 42 were observed on the disk. The information was reproduced in the same manner as in Example 42, giving waveform with sufficiently high S/N ratios.

EXAMPLE 44

In the same manner as in Example 42 but using the thiapyrylium compound No. 2-(6) in place of the thiapyrylium compound No. 2-(1), an optical recording disk was prepared and subjected to recording and reproduction tests, giving similar good results.

EXAMPLE 45

In the same manner as in Example 42 but using the thiapyrylium compound No. 2-(8) in place of the thiapyrylium compound No. 2-(1), an optical recording disk was prepared and subjected to recording and reproduction tests, giving similar good results.

EXAMPLE 46

In the same manner as in Example 42 but using the thiapyrylium compound No. 2-(15) in place of the thiapyrylium compound No. 2-(1), an optical recording disk was prepared and subjected to recording and reproduction tests, giving similar good results.

What we claim is:

1. An optical recording member including, in sequence, a disc substrate, and a film comprising a compound of the general formula:

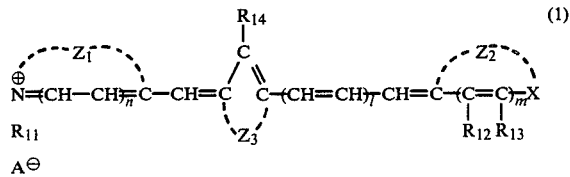

(1)

wherein; $Z_1$ is an atomic group necessary to form a substituted or unsubstituted nitrogen-containing heterocyclic compound ring; $Z_2$ is an atomic group necessary to form a substituted or unsubstituted pyrane, thiapyrane, selenapyrane, benzopyrane, benzothiapyrane, benzoselenapyrane, naphthopyrane, naphathiopyrane, or naphthoselenapyrane ring; X is a sulfur, oxygen, or selenium; $Z_3$ is a divalent hydrocarbon residue necessary to form a 5- or 6-membered ring substituted or unsubstituted; $R_{11}$ is a hydrogen atom or substituted or unsubstituted alkyl; $R_{12}$ and $R_{13}$ each are a hydrogen atom, halogen atom, alkyl, alkoxyl, aryl, substituted aryl, styryl, substituted styryl, or substituted or unsubstituted heterocyclic residue; $R_{14}$ is a hydrogen or halogen atom; $A^{\ominus}$ is an anion; m and n each are 0 or 1; and l is 0, 1, or 2.

2. The optical recording member according to claim 1, including, in sequence, a disc substrate, a reflecting layer and said film, wherein said film is an organic coating film.

3. The optical recording member according to claim 1, wherein the reflecting layer is a vapor-deposited layer or laminate layer of a reflective metal.

4. The optical recording member according to claim 3, wherein the reflective metal is aluminum, silver or chromium.

5. The optical recording member according to claim 1, including a disc substrate for supporting said film, said substrate formed of a polyester resin, acrylic resin, polyolefin resin, phenolic resin, polyamide resin, polyimide resin, or glass.

6. The optical recording member according to claim 1, wherein $Z_3$ in the general formula (1) is the residue $-CH_2-CH_2-$, $-CH_2-CH_2-CH_2-$,

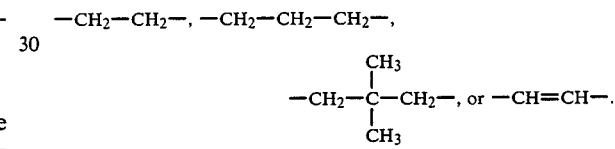

7. The optical recording member according to claim 1, wherein $Z_3$ in the general formula (1) is the residue $-CH_2-CH_2-$, $-CH_2-CH_2-CH_2-$,

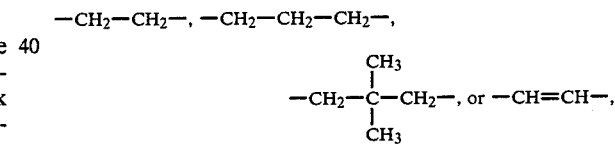

condensed with a benzene ring or naphthalene ring.

8. The optical recording member according to claim 1, wherein X in the general formula (1) is a sulfur atom.

9. The optical recording member according to claim 1, wherein $Z_2$ in the general formula (1) is an atomic group necessary to form thiapyrane ring.

10. The optical recording member according to claim 1, wherein $Z_1$ in the general formula (1) is an atomic group necessary to form benzothiazole ring.

11. The optical recording member according to claim 1, wherein $Z_1$ in the general formula (1) is an atomic group necessary to form quinoline ring.

12. The optical recording member according to claim 1, wherein said film comprises the compound of the general formula (1) and a binder.

13. The optical recording member according to claim 1, wherein said film comprises a vapor-deposited film of the compound of the general formula (1).

* * * * *

UNITED STATES PATENT AND TRADEMARK OFFICE
CERTIFICATE OF CORRECTION

PATENT NO. : 4,555,472

DATED : November 26, 1985

INVENTOR(S) : KAZUHARU KATAGIRI, ET AL.

Page 1 of 2

It is certified that error appears in the above-identified patent and that said Letters Patent is hereby corrected as shown below:

Abstract, change "naphathiopyrane" to --naphthothiopyrane--.

Column 2, line 57, change "orgnic" to --organic--.

Column 7, line 3, change "hydrid" to --hybrid--.
　　　　　line 32, change "residue, R25" to --residue. R25--.
　　　　　line 22, change "naphyl" to --naphthyl--.

Column 10, line 53, change "solevent." to --solvent.--.

Column 11, lines 2-3, insert table headings:
　　　--Typical compounds of the formula (2)(pyrylium,
　　　　thiapyrylium, or selenapyrylium)--.

Column 12, lines 2-3, insert table headings:
　　　--Typical compounds of the formula (2)(pyrylium,
　　　　thiapyrylium, or selenapyrylium)--.

Column 13, lines 2-3, insert table headings:
　　　--Typical compounds of the formula (2)(pyrylium,
　　　　thiapyrylium, or selenapyrylium)--.

Column 14, line 63, change "acrylate, poly(" to
　　　--acrylate), poly)--.

Column 15, line 14, change "include;" to --include:--.

Column 16, line 47, change "are;" to --are:--.

UNITED STATES PATENT AND TRADEMARK OFFICE
CERTIFICATE OF CORRECTION

PATENT NO. : 4,555,472

DATED : November 26, 1985

INVENTOR(S) : KAZUHARU KATAGIRI, ET AL.

It is certified that error appears in the above-identified patent and that said Letters Patent is hereby corrected as shown below:

Column 17, line 20, change "2,4,8-trinitrothioxanthone" to --2,4,8--trinitro-thioxanthone--.

line 32, change "trimethylindoleine" to --trimethylindolenine--.

Column 18, lines 27-28, change "in-clude;" to --in-clude:--.

Column 19, line 14, change "charge transporting" to --charge-transporting--.

line 21, change "triarylmethane," to --triarylmethanes--.

Column 22, line 15, change "was Observed" to --were observed--.

line 58, change "information" to --information,--.

Column 24, lines 52-53, center "EXAM-/PLE 42" on next line.

Column 25, line 4, change "semi-conductor" to --semiconductor-- line 15, change "rise about" to --rise above--.

Signed and Sealed this

Eleventh Day of November, 1986

Attest:

DONALD J. QUIGG

Attesting Officer      Commissioner of Patents and Trademarks